US011881103B2

(12) United States Patent
Lee et al.

(10) Patent No.: US 11,881,103 B2
(45) Date of Patent: Jan. 23, 2024

(54) SERVER AND METHOD FOR PROVIDING VEHICLE INFORMATION

(71) Applicants: Hyundai Motor Company, Seoul (KR); Kia Motors Corporation, Seoul (KR); HYUNDAI AUTOEVER CORP, Seoul (KR)

(72) Inventors: Sang Woo Lee, Seoul (KR); Seung Hyun Kim, Daejeon (KR)

(73) Assignees: Hyundai Motor Company, Seoul (KR); Kia Motors Corporation, Seoul (KR); Hyundai Autoever Corp, Seoul (KR)

( * ) Notice: Subject to any disclaimer, the term of this patent is extended or adjusted under 35 U.S.C. 154(b) by 442 days.

(21) Appl. No.: 16/941,910

(22) Filed: Jul. 29, 2020

(65) Prior Publication Data

US 2021/0312805 A1 Oct. 7, 2021

(30) Foreign Application Priority Data

Apr. 6, 2020 (KR) .......................... 10-2020-0041713

(51) Int. Cl.
*G08G 1/0967* (2006.01)
*G01C 21/34* (2006.01)

(52) U.S. Cl.
CPC ... *G08G 1/096716* (2013.01); *G01C 21/3492* (2013.01); *G08G 1/096775* (2013.01)

(58) Field of Classification Search
CPC ....... G08G 1/096716; G08G 1/096775; G01C 21/3492
See application file for complete search history.

(56) References Cited

U.S. PATENT DOCUMENTS 4,704,610 A * 11/1987 Smith .................... G08G 1/087
340/906
4,775,865 A * 10/1988 Smith .................... G08G 1/087
340/906
(Continued)

FOREIGN PATENT DOCUMENTS

CN 106530738 A 3/2017
CN 109844836 A 6/2019
(Continued)

OTHER PUBLICATIONS

C. Yufeng, et al., "Research of Traffic Information Collection in Intelligent Transportation System", Journal of Hubei Automotive Industries Institute, vol. 24, No. 2, Jun. 2010, 7 pages.
(Continued)

*Primary Examiner* — Luis A Martinez Borrero
(74) *Attorney, Agent, or Firm* — Fox Rothschild LLP

(57) ABSTRACT

A method for providing vehicle information, which is carried out using a server, includes steps of: receiving vehicle attribute information including a vehicle type and GPS trajectory information from a vehicle, storing the vehicle attribute information and the GPS trajectory information for each vehicle type based on the vehicle attribute information, generating specialized traffic information associated with a specialized vehicle type needing the specialized traffic information and generating normal traffic information associated with a normal vehicle type, and providing the specialized vehicle type with directions information based on the specialized traffic information, when a current situation is a special situation, and otherwise providing the normal vehicle type with directions information based on the normal traffic information.

21 Claims, 5 Drawing Sheets

(56) References Cited

U.S. PATENT DOCUMENTS

| | | | | |
|---|---|---|---|---|
| 5,214,793 A * | 5/1993 | Conway | ............... | G09B 29/106 |
| | | | | 455/500 |
| 5,504,482 A * | 4/1996 | Schreder | ............... | G01S 13/931 |
| | | | | 340/995.13 |
| 5,801,646 A * | 9/1998 | Pena | ............... | G08G 1/0965 |
| | | | | 340/904 |
| 5,955,968 A * | 9/1999 | Bentrott | ............... | G08G 1/087 |
| | | | | 455/67.15 |
| 6,480,783 B1 * | 11/2002 | Myr | ............... | G08G 1/096838 |
| | | | | 340/990 |
| 6,630,891 B1 * | 10/2003 | Dilling | ............... | G08G 1/0965 |
| | | | | 340/901 |
| 6,700,504 B1 * | 3/2004 | Aslandogan | ............... | G08G 1/087 |
| | | | | 340/901 |
| 6,754,580 B1 * | 6/2004 | Ask | ............... | G01C 21/34 |
| | | | | 340/995.23 |
| 6,862,524 B1 * | 3/2005 | Nagda | ............... | G08G 1/096816 |
| | | | | 340/995.13 |
| 6,958,707 B1 * | 10/2005 | Siegel | ............... | G08G 1/087 |
| | | | | 340/902 |
| 7,375,648 B1 * | 5/2008 | Mulka | ............... | G08G 1/042 |
| | | | | 340/905 |
| 7,395,151 B2 * | 7/2008 | O'Neill | ............... | G06Q 10/06 |
| | | | | 701/515 |
| 7,426,437 B2 * | 9/2008 | Breed | ............... | G01S 19/17 |
| | | | | 340/995.12 |
| 8,055,534 B2 * | 11/2011 | Ashby | ............... | G06Q 30/02 |
| | | | | 705/13 |
| 9,146,121 B2 * | 9/2015 | Husain | ............... | G08G 1/205 |
| 9,582,999 B2 * | 2/2017 | Lewis | ............... | G08G 1/0112 |
| 9,672,734 B1 * | 6/2017 | Ratnasingam | ............... | H04W 4/44 |
| 9,891,060 B2 * | 2/2018 | Gaither | ............... | G01C 21/3676 |
| 9,934,685 B1 * | 4/2018 | Bernhardt | ............... | G08G 1/095 |
| 9,964,414 B2 * | 5/2018 | Slavin | ............... | G01C 21/3658 |
| 10,553,110 B2 * | 2/2020 | Fowe | ............... | G06F 18/23213 |
| 10,794,720 B2 * | 10/2020 | Slavin | ............... | G01C 21/3492 |
| 11,193,780 B2 * | 12/2021 | Alcazar | ............... | G01C 21/20 |
| 11,433,917 B2 * | 9/2022 | Adireddy | ............... | G08G 1/163 |
| 2003/0063015 A1 * | 4/2003 | Ebner | ............... | G08G 1/096783 |
| | | | | 340/933 |
| 2003/0154017 A1 * | 8/2003 | Ellis | ............... | A61H 3/068 |
| | | | | 701/422 |
| 2005/0035878 A1 * | 2/2005 | Vassilevsky | ............... | G08G 1/0965 |
| | | | | 340/902 |
| 2005/0104745 A1 * | 5/2005 | Bachelder | ............... | G08G 1/01 |
| | | | | 340/988 |
| 2006/0125655 A1 * | 6/2006 | McMahon | ............... | G08G 1/096872 |
| | | | | 340/907 |
| 2006/0136291 A1 * | 6/2006 | Morita | ............... | H04H 40/90 |
| | | | | 340/995.13 |
| 2006/0158330 A1 * | 7/2006 | Gueziec | ............... | G08G 1/096716 |
| | | | | 340/905 |
| 2006/0184319 A1 * | 8/2006 | Seick | ............... | G01C 21/28 |
| | | | | 340/995.19 |
| 2007/0027583 A1 * | 2/2007 | Tamir | ............... | H01L 23/49838 |
| | | | | 701/1 |
| 2007/0138347 A1 * | 6/2007 | Ehlers | ............... | G01C 21/34 |
| | | | | 246/1 R |
| 2007/0159354 A1 * | 7/2007 | Rosenberg | ............... | G08G 1/0965 |
| | | | | 340/902 |
| 2007/0174467 A1 * | 7/2007 | Ballou | ............... | H04L 63/0838 |
| | | | | 709/227 |
| 2007/0198168 A1 * | 8/2007 | Nathan | ............... | G08G 1/096811 |
| | | | | 701/117 |
| 2007/0282638 A1 * | 12/2007 | Surovy | ............... | G06Q 40/08 |
| | | | | 705/4 |
| 2008/0040031 A1 * | 2/2008 | Tu | ............... | G08G 1/096775 |
| | | | | 701/414 |
| 2008/0109162 A1 * | 5/2008 | Chen | ............... | G01C 21/3492 |
| | | | | 701/414 |
| 2008/0189034 A1 * | 8/2008 | Sugiura | ............... | G01C 21/20 |
| | | | | 701/533 |
| 2008/0281960 A1 * | 11/2008 | Schibler | ............... | G06F 16/29 |
| | | | | 709/224 |
| 2009/0030603 A1 * | 1/2009 | Madalin, Jr. | ............... | G01C 21/3697 |
| | | | | 701/533 |
| 2009/0119014 A1 * | 5/2009 | Caplan | ............... | G01S 19/51 |
| | | | | 342/357.34 |
| 2009/0174572 A1 * | 7/2009 | Smith | ............... | G08G 1/0965 |
| | | | | 340/902 |
| 2009/0189979 A1 * | 7/2009 | Smyth | ............... | G08G 1/096775 |
| | | | | 348/143 |
| 2010/0153002 A1 * | 6/2010 | Lee | ............... | G01C 21/3407 |
| | | | | 701/533 |
| 2010/0201505 A1 * | 8/2010 | Honary | ............... | G06Q 30/04 |
| | | | | 707/769 |
| 2010/0228404 A1 * | 9/2010 | Link, II | ............... | G06F 9/44542 |
| | | | | 701/1 |
| 2010/0245581 A1 * | 9/2010 | Koyama | ............... | G08G 1/0965 |
| | | | | 348/149 |
| 2010/0250111 A1 * | 9/2010 | Gutierrez | ............... | G01C 21/3697 |
| | | | | 701/532 |
| 2010/0292914 A1 * | 11/2010 | Vepsalainen | ............... | G01C 21/3453 |
| | | | | 701/532 |
| 2010/0292916 A1 * | 11/2010 | Kurciska | ............... | G01C 21/3453 |
| | | | | 701/533 |
| 2011/0018736 A1 * | 1/2011 | Carr | ............... | G08G 1/0965 |
| | | | | 340/902 |
| 2011/0040621 A1 * | 2/2011 | Ginsberg | ............... | G01C 21/3492 |
| | | | | 340/905 |
| 2011/0102202 A1 * | 5/2011 | Lin | ............... | G08G 1/0965 |
| | | | | 340/988 |
| 2011/0109480 A1 * | 5/2011 | Huijnen | ............... | G08G 1/096861 |
| | | | | 340/932.2 |
| 2011/0181443 A1 * | 7/2011 | Gutierrez | ............... | G01C 21/3697 |
| | | | | 340/990 |
| 2011/0264360 A1 * | 10/2011 | Boss | ............... | G06Q 50/26 |
| | | | | 701/117 |
| 2012/0072051 A1 * | 3/2012 | Koon | ............... | G05D 1/0297 |
| | | | | 701/2 |
| 2012/0078506 A1 * | 3/2012 | Husain | ............... | G08G 1/096844 |
| | | | | 701/414 |
| 2012/0092187 A1 * | 4/2012 | Scholl | ............... | G08G 1/096766 |
| | | | | 340/905 |
| 2012/0136559 A1 * | 5/2012 | Rothschild | ............... | G08G 1/096741 |
| | | | | 348/148 |
| 2014/0032098 A1 * | 1/2014 | Anderson | ............... | B60N 2/002 |
| | | | | 701/428 |
| 2014/0085107 A1 * | 3/2014 | Gutierrez | ............... | G08G 1/0965 |
| | | | | 340/905 |
| 2014/0278052 A1 * | 9/2014 | Slavin | ............... | G01C 21/3492 |
| | | | | 701/400 |
| 2015/0120174 A1 * | 4/2015 | Lewis | ............... | G08G 1/0129 |
| | | | | 701/118 |
| 2015/0197248 A1 * | 7/2015 | Breed | ............... | G08G 1/09626 |
| | | | | 340/905 |
| 2015/0213713 A1 * | 7/2015 | Taylor | ............... | G08G 1/0125 |
| | | | | 340/906 |
| 2016/0169688 A1 * | 6/2016 | Kweon | ............... | G08G 1/096741 |
| | | | | 701/522 |
| 2016/0379486 A1 * | 12/2016 | Taylor | ............... | G08G 1/08 |
| | | | | 340/905 |
| 2017/0032670 A1 * | 2/2017 | Poornachandran | ............... | G08G 1/096783 |
| 2017/0085632 A1 * | 3/2017 | Cardote | ............... | H04W 4/70 |
| 2017/0132916 A1 * | 5/2017 | Ioli | ............... | G08G 1/005 |
| 2017/0132919 A1 * | 5/2017 | Ioli | ............... | G08G 1/093 |
| 2017/0284814 A1 * | 10/2017 | Gaither | ............... | G01C 21/3658 |
| 2017/0352268 A1 * | 12/2017 | Colella | ............... | G08G 1/0965 |
| 2018/0164111 A1 * | 6/2018 | Jung | ............... | G08G 1/01 |
| 2018/0299290 A1 * | 10/2018 | Slavin | ............... | G08G 1/0145 |
| 2018/0301034 A1 * | 10/2018 | Morita | ............... | G01C 21/3492 |
| 2018/0374346 A1 * | 12/2018 | Fowe | ............... | G08G 1/0129 |
| 2019/0012912 A1 * | 1/2019 | Kim | ............... | G08G 1/096716 |
| 2019/0266890 A1 | 8/2019 | Lei et al. | | |
| 2019/0271550 A1 * | 9/2019 | Breed | ............... | F21S 41/13 |
| 2019/0272742 A1 * | 9/2019 | Ioli | ............... | G08G 1/096775 |
| 2020/0003577 A1 * | 1/2020 | Kline | ............... | G01C 21/3602 |

(56) References Cited

U.S. PATENT DOCUMENTS

2020/0202711 A1* 6/2020 Martin ................. G08G 1/0145
2020/0219404 A1* 7/2020 Lin ....................... G08G 1/015
2020/0266891 A1* 8/2020 Murakami ........... H04B 10/116

FOREIGN PATENT DOCUMENTS

CN           110603181 A      12/2019
KR      10-2015-0042501 A      4/2015

OTHER PUBLICATIONS

Notification of First Office Action for Chinese Patent Application No. 2020108166496.6 dated Sep. 25, 2023 from the China National Intellectual Property Administration, 24 pages, with English translation.

* cited by examiner

SERVER AND METHOD FOR PROVIDING VEHICLE INFORMATION

CROSS-REFERENCE TO RELATED APPLICATION

This application is claims under 35 U.S.C. § 119(a) the benefit of Korean Patent Application No. 10-2020-0041713, filed in the Korean Intellectual Property Office on Apr. 6, 2020, the entire contents of which are incorporated herein by reference.

BACKGROUND

(a) Technical Field

The present disclosure relates to a server and method for providing vehicle information, more particularly, to the server and method for providing vehicle information configured to provide a vehicle type and directions information based on the vehicle type.

(b) Description of the Related Art

Traffic information typically is collected and provided without regard to vehicle type, and in some cases, the traffic information may have low utility to vehicle users and/or may act as noise with respect to some vehicle types.

For example, for a bus or van capable of using a lane or road restricted to buses, a guide to such a lane or road, which may be provided to other normal vehicles when the highway is congested, would be unnecessary or incorrect information. In other words, a guide to the bus-only road may be provided as traffic information where it is possible for such a van to travel quickly, but the van may be guided to a road provided to other normal vehicles upon route discovery in such a situation.

Furthermore, when the number of collected vehicles is 1, existing traffic information may be used without correction because there is no division of vehicle type.

For example, when one truck passes, because the truck should travel at less than a certain speed, although it is possible for a normal vehicle type to travel more quickly than the truck, traffic information about the normal vehicle may be provided in response to the truck. Thus, information about a low speed may be provided to the normal vehicle type. Alternatively, on the other hand, due to traffic information generated while a high-performance vehicle with a high vehicle speed passes, speed information higher than an expected speed may be provided to the normal vehicle type.

Thus, there is a need for a method for separately collecting and processing traffic information for each vehicle type and separately providing traffic information for each vehicle type as needed.

SUMMARY

An aspect of the present disclosure provides a server and method for providing vehicle information to separately collect and process traffic information for each vehicle type and separately provide traffic information for each vehicle type if necessary.

Another aspect of the present disclosure provides a server and method for providing vehicle information to correct a speed of a probe when the number of probes is insufficient when generating traffic generating and generate traffic information depending on the corrected speed to improve accuracy of the traffic information.

According to an aspect of the present disclosure, a server for proving vehicle information may include: a vehicle information receiver configured to receive vehicle attribute information including a vehicle type and global positioning system (GPS) trajectory information from a vehicle, a vehicle information storage storing the vehicle attribute information and the GPS trajectory information for each vehicle type based on the vehicle attribute information, a traffic information generator configured to generate specialized traffic information associated with a specialized vehicle type needing the specialized traffic information and generate normal traffic information associated with a normal vehicle type, and a traffic information provider configured to provide the specialized vehicle type with directions information based on the specialized traffic information, when a current situation is a special situation, and otherwise provide the normal vehicle type with directions information based on the normal traffic information.

The traffic information generator may generate the specialized traffic information associated with the specialized vehicle type, based on a table for the specialized vehicle type and the special situation needing the specialized traffic information in response to the specialized vehicle type.

The traffic information provider may generate directions information about a route corresponding to a route discovery request and may provide the vehicle with the directions information, when the route discovery request is received from the vehicle.

The specialized vehicle type may be a truck, a high occupancy vehicle, or a special vehicle including an ambulance or a fire truck.

The special situation may be a road congestion situation, when the specialized vehicle type is the high occupancy vehicle. In this case, the traffic information generator may generate traffic information including a route where the vehicle travels on a bus-only road.

The traffic information generator may generate traffic information in which a truck speed limit is reflected, when the specialized vehicle type is the truck.

The traffic information generator may generate overall traffic information to be provided to the specialized vehicle type and the normal vehicle type in response to a predetermined situation. The traffic information provider may provide the specialized vehicle type and the normal vehicle type with directions information based on the overall traffic information.

The predetermined situation may be that the number of probes corresponding to the number of recognized vehicles is less than a predetermined threshold.

The traffic information generator may correct a speed of the specialized vehicle type, when the number of probes corresponding to the number of recognized vehicles is less than a predetermined threshold, and may generate the traffic information based on the corrected speed.

The traffic information generator may correct the speed of the specialized vehicle type depending on whether there are traffic lights on a road.

The traffic information generator may increase a speed of a truck or a high occupancy vehicle, when the specialized vehicle type is the truck or the high occupancy vehicle, and may decrease a speed of an ambulance or a fire truck, when the specialized vehicle type is the ambulance or the fire truck.

According to another aspect of the present disclosure, a method for proving vehicle information may include: receiving, by a server, vehicle attribute information including a vehicle type and GPS trajectory information from a vehicle, storing, in memory of the server, the vehicle attribute information and the GPS trajectory information for each vehicle type based on the vehicle attribute information, generating, by the server, specialized traffic information associated with a specialized vehicle type needing the specialized traffic information and generating, by the server, normal traffic information associated with a normal vehicle type, and providing the specialized vehicle type with directions information based on the specialized traffic information, when a current situation is a special situation, and providing the normal vehicle type with directions information based on the normal traffic information.

According to a further aspect of the present disclosure, a non-transitory computer readable medium containing program instructions executed by a processor includes: program instructions that receive vehicle attribute information including a vehicle type and GPS trajectory information from a vehicle; program instructions that store the vehicle attribute information and the GPS trajectory information for each vehicle type based on the vehicle attribute information; program instructions that generate specialized traffic information associated with a specialized vehicle type needing the specialized traffic information and generating normal traffic information associated with a normal vehicle type; and program instructions that provide the specialized vehicle type with directions information based on the specialized traffic information, when a current situation is a special situation, and otherwise providing the normal vehicle type with directions information based on the normal traffic information.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
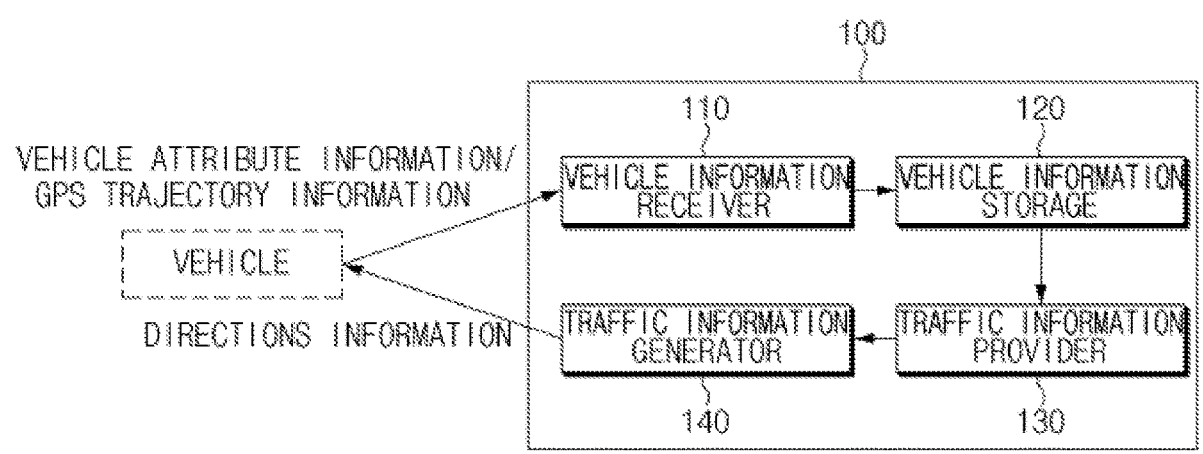
FIG. 1 is a control block diagram illustrating a server for providing vehicle information according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 5.

FIG. 1 is a control block diagram illustrating a server 100 for providing vehicle information according to an embodiment of the present disclosure.

As shown in FIG. 1, the server 100 for providing the vehicle speed may include a vehicle information receiver 110, a vehicle information storage 120 (i.e., memory), a traffic information generator 130, and a traffic information provider 140. The server may be embodied as a computer including the memory and processor(s).

Such a server for providing the vehicle information may be implemented as hardware capable of transmitting and receiving a certain signal with a vehicle through communication with the vehicle and receiving global positioning system (GPS) trajectory information of the vehicle. Furthermore, the server for providing the vehicle information may be implemented as hardware capable of generating directions information and providing a user with the generated directions information via a navigation device provided in the vehicle.

The vehicle information receiver 110 may receive vehicle attribute information including a vehicle type and GPS trajectory information from the vehicle.

According to an example, the vehicle type can be a truck, a high occupancy vehicle, or a special vehicle such as an ambulance or a fire truck. In the present disclosure below, a vehicle needing specialized traffic information may be referred to as a specialized vehicle type, and a vehicle other than the specialized vehicle type may be referred to as a normal vehicle type. Alternatively, the specialized vehicle type may be referred to as a special vehicle or a specialized vehicle, and the normal vehicle type may be referred to as a normal vehicle.

The vehicle may transmit its GPS information on the road to the vehicle information receiver 110 through a navigation application or device or the like loaded into or provided in the vehicle.

A user may request the server to provide the vehicle information for performing route discovery. GPS information of the vehicle together with such a request may be transmitted to the vehicle information receiver 110.

The vehicle information storage 120 may store vehicle attribute information and GPS trajectory information for each vehicle type based on the vehicle attribute information received from the vehicle. In other words, the vehicle information storage 120 may identify a vehicle type of a specific vehicle located on the road and may collect and store GPS trajectory information about the vehicle type for each vehicle type.

Furthermore, the vehicle information storage 120 may store a table about a specialized vehicle type which needs specialized traffic information and a special situation which needs specialized traffic information in response to the specialized vehicle type.

According to a table according to an example, only when the vehicle is a specialized vehicle, a special situation condition may be met. Alternatively, when the vehicle is the specialized vehicle and when a predetermined additional environment condition is met, the special situation condition may be met.

Such a table may be updated based on an environmental change according to a traffic situation, a weather condition, or the like.

The traffic information generator 130 may generate specialized traffic information associated with a specialized vehicle type based on such a table and may generate normal traffic information associated with a normal vehicle type.

As described above, only when the vehicle is a specialized vehicle, a special situation condition may be met. Alternatively, when the vehicle is the specialized vehicle and when a predetermined additional environment condition is met, the special situation condition may be met. For example, when the specialized vehicle is a truck or a high occupancy vehicle, specialized traffic information may be generated when the specialized vehicle is the vehicle type and when a special situation corresponding to the vehicle type occurs. When the specialized vehicle is a special vehicle such as an ambulance or a fire truck, a condition where specialized traffic information is generated may be met only when the specialized vehicle is the vehicle type.

When the specialized vehicle type is a high occupancy vehicle, the traffic information generator 130 may generate specialized traffic information including a route where the specialized vehicle type drives on a bus-only lane in a special situation which is a road congestion situation. When the specialized vehicle type is a truck, the traffic information generator 130 may generate special traffic information in which a truck speed limit is reflected.

Alternatively, the traffic information generator 130 may generate overall traffic information to be provided to a specialized vehicle type and a normal vehicle type in response to a predetermined situation.

For example, such a predetermined situation may be that a number of probes corresponding to a number of the recognized vehicles is less than a predetermined threshold. In other words, when accuracy of traffic information specialized in a vehicle type is low because the number of probes is insufficient or when it is not necessary to divide specialized traffic information and normal traffic information, the traffic information generator 130 may generate overall traffic information.

Alternatively, according to an example, when the number of probes is less than a predetermined threshold, the traffic information generator 130 may correct a speed of a specialized vehicle type and may generate traffic information based on the corrected speed. The correction of the speed by vehicle type will be described below.

When a route discovery request is received from the vehicle, the traffic information provider 140 may generate directions information about a route corresponding to the route discovery request and may provide the vehicle with the generated directions information.

Furthermore, when determining a current situation as a special situation depending on the table, the traffic information provider 140 may provide a specialized vehicle type with directions information based on specialized traffic information and may provide a normal vehicle type with directions information based on normal traffic information.

When the traffic information generator 130 generates the overall traffic information, the traffic information provider 140 may provide the specialized vehicle type and the normal vehicle type with directions information based on the overall traffic information.

As such, according to an embodiment of the present disclosure, because of collecting and providing traffic information for each vehicle type, traffic information suitable for a particular vehicle type may be generated and accuracy of traffic information may be improved. Furthermore, the accuracy of prediction for an estimated time of arrival may be improved using the improved traffic information, and quality of service according to fast directions may be enhanced.

Figure 2:
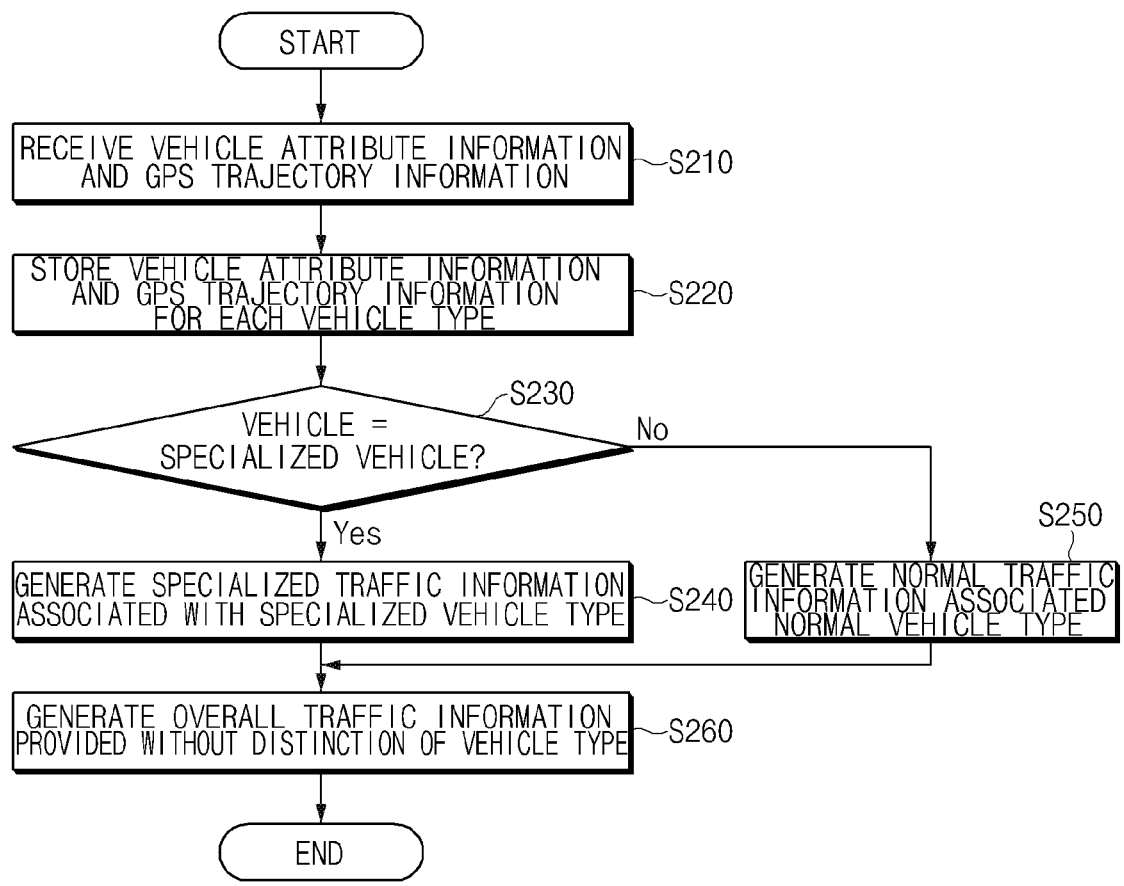
FIG. 2 is a control flowchart illustrating a method for generating traffic information according to a vehicle type according to an embodiment.

FIG. 2 is a control flowchart illustrating a method for generating traffic information according to a vehicle type according to an embodiment.

As shown, first of all, in S210, a vehicle information receiver 110 of a server for providing vehicle information may receive vehicle attribute information including a vehicle type and GPS trajectory information from a vehicle.

Furthermore, in S220, a vehicle information storage 120 of the server 100 may store the vehicle attribute information and the GPS trajectory information for each vehicle type based on the vehicle attribute information.

As described above, the vehicle information storage 120 may store a table about a specialized vehicle type which needs specialized traffic information and a special situation which needs the specialized traffic information in response to the specialized vehicle type.

In S230, a traffic information generator 130 of the server 100 may determine whether the vehicle is a specialized vehicle, based on information about the vehicle and the table.

When the vehicle is the specialized vehicle and when a current situation is a special situation when needs specialized traffic information, in S240, the traffic information generator 130 may generate specialized traffic information associated with the specialized vehicle type.

The specialized traffic information may refer to traffic information separately generated in response to a vehicle type by dividing the vehicle type necessary to distinctively receive traffic information. Such specialized traffic information may be data generated in only a special situation based on a table about a vehicle type necessary to distinctively receive traffic information and a situation necessary to distinctively receive traffic information, which is not used all time or spaces because the number of probes is able to be insufficient.

On the other hand, when the vehicle is not the specialized vehicle, in S250, the traffic information generator 130 may generate normal traffic information associated with a normal vehicle type.

The normal traffic information may be traffic information generated for a service to be provided to a normal vehicle type except for a specialized vehicle type.

Furthermore, in S260, the traffic information generator 130 may generate overall traffic information using all probes for a service provided without distinction of vehicle type. For example, the overall traffic information may be the same as traffic information which is provided previously to the vehicle.

Figure 3:
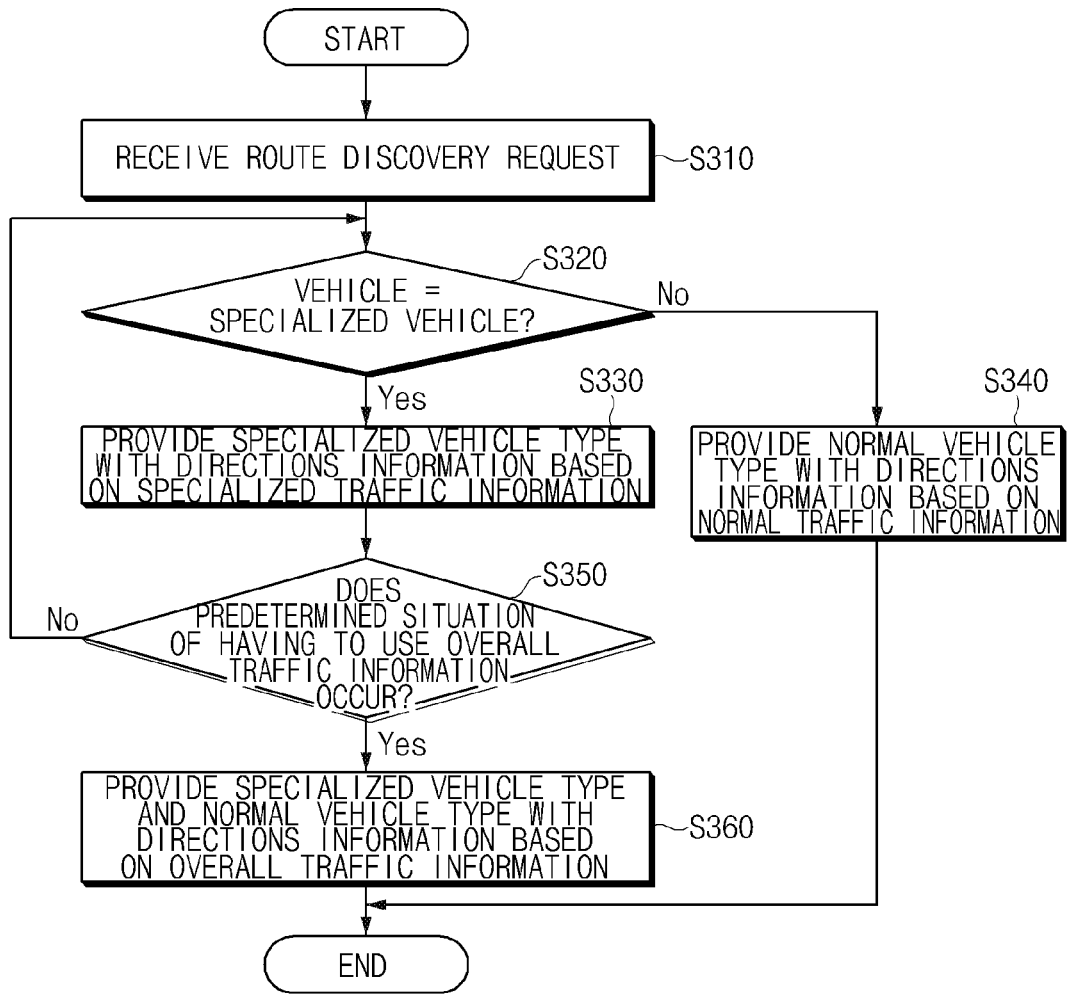
FIG. 3 is a control flowchart illustrating a method for providing directions information according to a vehicle type according to an example of the present disclosure.

FIG. 3 is a control flowchart illustrating a method for providing directions information according to a vehicle type according to an example of the present disclosure.

First of all, when a route discovery request is received from a vehicle in S310, in S320, a traffic information provider 140 of FIG. 1 may determine whether the vehicle is a specialized vehicle, based on information about the vehicle and a table.

Such a determination step may be performed by a traffic information generator 130 of FIG. 1. Generating traffic information and providing directions information may proceed through a series of processes.

When the vehicle is the specialized vehicle and when a current situation is a special situation which needs specialized traffic information, in S330, the traffic information generator 140 may provide the specialized vehicle type with directions information based on the specialized traffic information.

In other words, the traffic information provider 140 may discover a requested route using the specialized traffic information and may provide the specialized vehicle type with the discovered directions information.

For example, when a truck more than 4.5 tons performs route discovery, although the discovered road is a fast road using traffic information of a normal vehicle, the discovered road may not be the fast road actually because it is difficult for the truck to travel at a corresponding speed due to a truck speed limit. In such a case, the traffic information provider 140 may separately guide the truck along a fast road using specialized traffic information specialized in the truck.

According to another example, a high occupancy vehicle except for trucks may use a buy-only road on the highway. In general, when information about the bus-only road is ignored when the highway is congested, directions to use a normal road may be provided to a high occupancy vehicle and an incorrect estimated time of arrival may be provided to the high occupancy vehicle. However, according to an embodiment of the present disclosure, when providing directions information using traffic information only for high occupancy vehicles, the traffic information provider 140 may guide a high occupancy vehicle along a route using a bus-only road on the highway and may provide the high occupancy vehicle with a more accurate estimated time of arrival.

On the other hand, when the vehicle is not the specialized vehicle, in S340, the traffic information provider 140 may provide a normal vehicle type with directions information based on normal traffic information.

Although the separately divided directions information is provided, when a predetermined situation which should use overall traffic information occurs in S350, in S360, the traffic information provider 140 may provide a specialized vehicle type and a normal vehicle type with directions information based on such overall traffic information.

The predetermined situation may be that the number of probes corresponding to the number of the recognized vehicles is less than a predetermined threshold, for example, 3.

Figure 4:
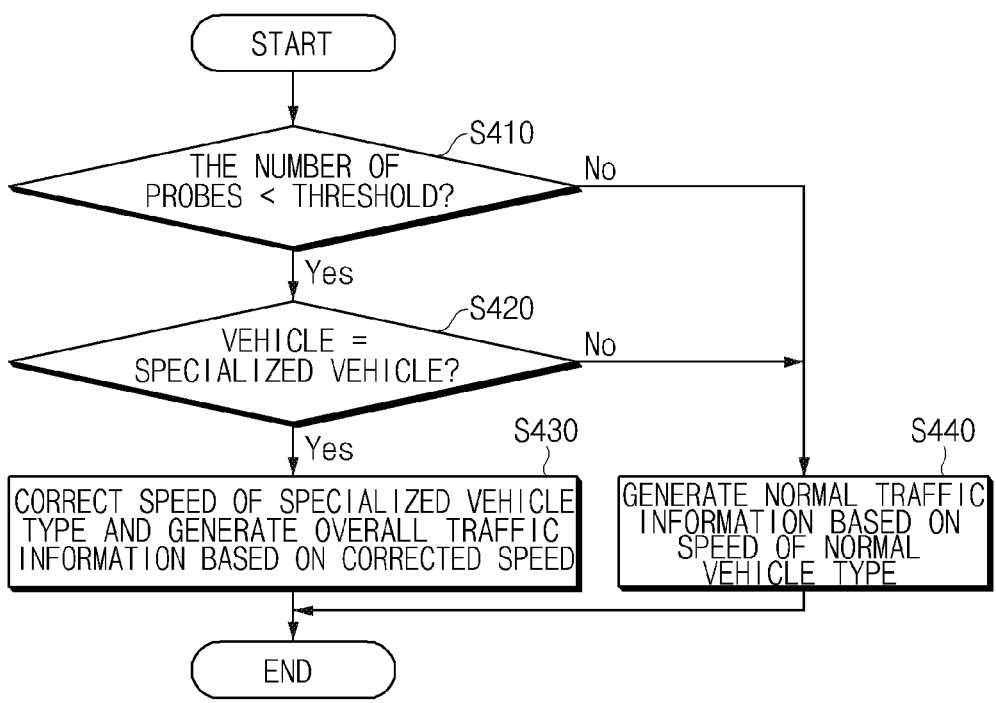
FIG. 4 is a control flowchart illustrating a method for correcting a speed according to an example of the present disclosure.

FIG. 4 is a control flowchart illustrating a method for correcting a speed according to an example of the present disclosure.

When a predetermined situation of FIG. 3 occurs or when the number of probes corresponding to the number of recognized vehicles is less than a predetermined threshold in S410, in S420, a traffic information generator 130 of FIG. 1 may determine whether the vehicle is a specialized vehicle type.

In other words, the traffic information generator 130 may determine whether specialized vehicle type traffic information is generated and may correct a speed of the vehicle.

According to a study ("Development of Models for Measuring Efficiency and CO2 Emissions, and Methodology for the Environmental Impact Assessment of ITS Service," 2013, Yu. B. Y.), in general, when the number of probes is greater than or equal to 3, the reliability of corresponding traffic information may be high (ensure validity of more than 80%). However, because there is a high probability that reliability will be low when the number of probes is less than 3, at this time, when there is a probe of a specialized vehicle type rather than a normal vehicle type, the probe may be corrected to be used to generate traffic information.

When the vehicle is the specialized vehicle type, in S430, the traffic information generator 130 may correct a speed of the specialized vehicle type and may generate overall traffic information based on the corrected speed.

According to an example, a traffic information provider 140 of FIG. 1 may correct a speed of the specialized vehicle type depending on whether there are traffic lights on the road.

In this case, when the specialized vehicle type is a truck or a high occupancy vehicle, the traffic information generator 130 may increase a speed of the truck or the high occupancy vehicle. When the specialized vehicle type is a special vehicle, the traffic information generator 130 may decrease a speed of the special vehicle.

This is exemplified as Table 1 below.

TABLE 1

| Vehicle type | Interrupted flow (Road where there is a signal) | Uninterrupted flow (Road where there is no signal) |
|---|---|---|
| Trucks more than 4.5 tons | Correct the speed to 130% of the speed on the basis of the speed limit | Correct the speed to 120% of the speed on the basis of the speed limit |
| high occupancy vehicles except for trucks | Correct the speed to 105% of the speed | Correct the speed to 110% of the speed |
| vehicles with not more than two persons | Correct the speed to 130% of the speed | Correct the speed to 120% of the speed |
| Special vehicles such as ambulances | Correct the speed to 85% of the speed (Herein, there is no correction when the speed is greater than or equal to the speed limit) | Correct the speed to 90% of the speed (Herein, there is no correction when the speed is greater than or equal to the speed limit) |
| High-performance vehicles | | Correct the speed to 75% |

Alternatively, according to an example, an algorithm for speed correction for each vehicle type may be represented as Table 2 below.

TABLE 2

When providing normal-vehicle traffic information
SvcSpd* = ((CCF$_{special}$* (VCF$_{normal}$ * CF * S$_{special}$)) + (CCF$_{normal}$ * S$_{normal}$))/(CCF$_{special}$ CCF$_{normal}$) * additional comment
→ when collecting both of special vehicle and normal vehicle: special vehicle correction speed + normal vehicle speed
→ when collecting only special vehicle: special vehicle correction speed
→ when collecting only normal vehicle: normal vehicle speed
When providing special-vehicle traffic information
SvcSpd* = ((CCF$_{special}$ * S$_{special}$) + (CCF$_{normal}$ * (VCF$_{special}$ * CF * S$_{normal}$)))/(CCF$_{special}$ CCF $_{normal}$) * additional comment
→when collecting both of special vehicle and normal vehicle: special vehicle speed + normal correction vehicle speed
→ when collecting only special vehicle: special vehicle speed
→ when collecting only normal vehicle: normal vehicle correction speed
When providing unknown (any)-vehicle traffic information
SvcSpd* = ((CCF$_{special}$ * CF * S$_{special}$) + (CCF$_{normal}$ * CF * S$_{normal}$)) (CCF$_{special}$ CCF$_{normal}$) * additional comment
→ use collected speed
SvcSpd *: Speed provided by vehicle type
CCF$_{special}$: Special-Collection Check Factor
CCF$_{normal}$: Normal Collection Check Factor
    → lupon collection, O upon no collection
VCF$_{special}$: Special-Vehicle Correction Factor
VCF$_{normal}$: Normal-Vehicle Correction Factor
CF: Congestion Factor
    → Weight 0~1 according to whether there is congestion
S$_{special}$: Special-Vehicle Speed (km/h)
S$_{normal}$: Normal-Vehicle Speed (km/h)

Meanwhile, when the number of probes is greater than the threshold and when the vehicle is not the specialized vehicle, in S440, the traffic information generator 130 may generate traffic information using a speed about a normal vehicle type.

Figure 5:
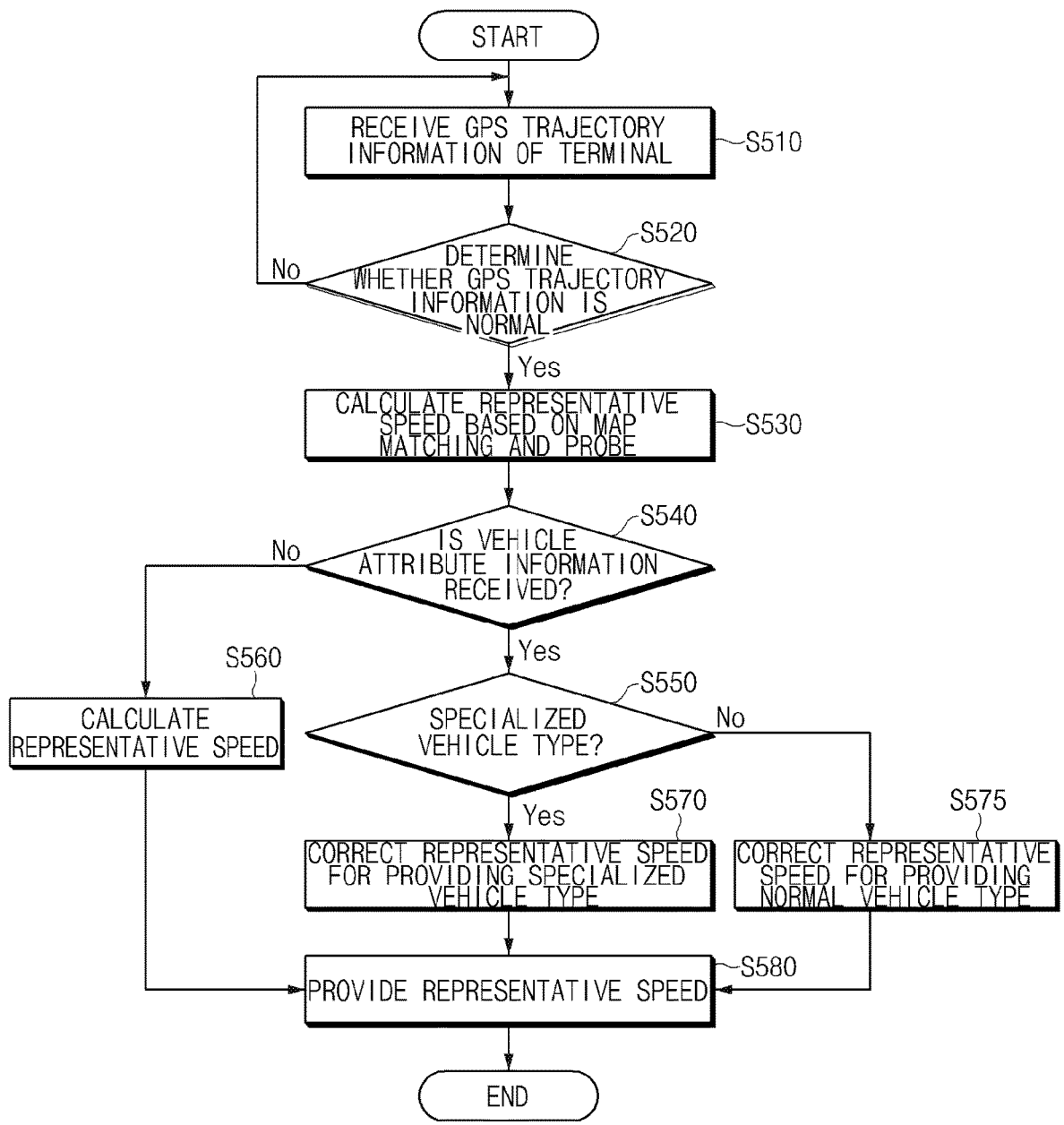
FIG. 5 is a control flowchart illustrating a method for generating and providing traffic information according to an example of the present disclosure.

FIG. 5 is a control flowchart illustrating a method for generating and providing traffic information according to an example of the present disclosure.

In FIG. 5, Table 2 above may be used for a process of correcting and calculating a representative speed of a vehicle.

First of all, in S510, a vehicle information receiver 110 of FIG. 1 may receive GPS trajectory information of a terminal, that is, the vehicle. In S520, the vehicle information receiver 110 may determine whether the received GPS trajectory information is normal.

That the GPS trajectory information is normal may mean that received GPS trajectory data has no abnormality in a current road situation, time information, speed information, or the like.

When the GPS trajectory information is normal without abnormality as a result of the determination, in S530, a server 100 for providing vehicle information may calculate a representative speed based on received information including all GPS trajectories received based on map matching and probes.

The representative speed in a current step may refer to a representative speed for vehicles, which is calculated according to an existing method without distinction of vehicle type.

Thereafter, in S540 and S550, the server 100 for providing the vehicle information may determine whether a vehicle type of a vehicle which provides attribute information is a specialized vehicle type, based on whether the attribute information about the vehicle is received.

When the attribute information about the vehicle is not received, in S560, a service such as directions information may be provided to the vehicle based on the representative speed calculated in S530.

Meanwhile, when the vehicle type of the vehicle is the specialized vehicle type, in S570 and S575, a traffic information generator 130 of FIG. 1 may correct a representative speed for providing the specialized vehicle type and a representative speed for providing a normal vehicle type.

Representative speeds capable of being provided to a specialized vehicle type and a normal vehicle type may be corrected based on Table 2 above. According to Table 2 above, in speed provided by vehicle type, a special (specialized)-collection check factor and a normal-collection check factor may be used for received speed information of the vehicle and a special-vehicle correction factor and a normal-vehicle correction factor may be applied to the received speed information of the vehicle. In addition, a congestion factor corresponding to a weight according to whether there is congestion may be multiplied by a speed of each vehicle type to be weight calculated.

The representative speed may be corrected according to when a usual representative speed is calculated (when unknown (any)-vehicle traffic information of Table 2 above is provided) and when a representative speed is calculated for each vehicle type (when normal-vehicle traffic information of Table 2 above is provided and when special-vehicle traffic information of Table 2 above is provided).

In S580, the corrected representative speed or directions information based on the representative speed may be provided to the vehicle.

In general, the normal vehicle type and the specialized vehicle type may drive in different flows by various environmental elements such as performance and the lane of the vehicle. Thus, traffic information provided to different vehicle types should be corrected and delivered to suit as many tendencies as possible for each vehicle type. The present disclosure may provide traffic information based on speed correction according to a vehicle type of the vehicle and may provide more accurate traffic information using a correction factor although collecting traffic information of a different vehicle type because there are a small number of collections.

According to an embodiment of the present disclosure, the server and method for providing vehicle information may separately collect and process traffic information for each vehicle type and may separately provide traffic information for each vehicle type if necessary.

According to an embodiment of the present disclosure, the server and method for providing vehicle information may generate traffic information except for a vehicle type which is a noise by collecting traffic information for each vehicle type and may provide a vehicle type, which needs division of traffic information, with specialized route discovery using traffic information for each vehicle type.

According to an embodiment of the present disclosure, the server and method for providing vehicle information may correct a speed of a probe when the number of probes is insufficient, when generating traffic generating, and may generate traffic information depending on the corrected speed, thus improving accuracy of the traffic information.

Furthermore, according to an embodiment of the present disclosure, the server and method for providing vehicle information may correct and use traffic information using vehicle type information and trajectory information rather than a center or camera for dividing a vehicle type.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A server for providing vehicle information, the server comprising:
 a vehicle information receiver including at least one processor configured to receive vehicle attribute information including a vehicle type and global positioning system (GPS) trajectory information from a vehicle;
 a vehicle information storage storing the vehicle attribute information and the GPS trajectory information for each vehicle type based on the vehicle attribute information;
 a traffic information generator including at least one processor configured to:
  generate first traffic information associated with a specialized vehicle type needing the specialized traffic information, wherein the specialized vehicle type is at least one of a truck, a high occupancy vehicle, an ambulance, or a fire truck; and
  generate second traffic information associated with a normal vehicle type, wherein the normal vehicle type is a vehicle other than the specialized vehicle type; and
 a traffic information provider including at least one processor configured to:
  provide the specialized vehicle type with directions information based on the first traffic information, when a current situation is a special situation; and
  provide the normal vehicle type with directions information based on the second traffic information;
  wherein the traffic information generator generates third traffic information to be provided to the specialized vehicle type and the normal vehicle type in response to determining that a predetermined situation occurs where it is not necessary to divide the first and second traffic information.

2. The server of claim 1, wherein the traffic information generator generates the first traffic information associated with the specialized vehicle type, based on a table for the specialized vehicle type and the special situation needing the first traffic information in response to the specialized vehicle type.

3. The server of claim 1, wherein the traffic information provider generates directions information about a route corresponding to a route discovery request and provides the vehicle with the directions information about the route, when the route discovery request is received from the vehicle.

4. The server of claim 1, wherein the special situation is a road congestion situation, when the specialized vehicle type is the high occupancy vehicle.

5. The server of claim 4, wherein the traffic information generator generates the first traffic information including a route where the vehicle travels on a bus-only road.

6. The server of claim 4, wherein the traffic information generator generates the first traffic information in which a truck speed limit is reflected, when the specialized vehicle type is the truck.

7. The server of claim 1, wherein the traffic information provider provides the specialized vehicle type and the normal vehicle type with directions information based on the third traffic information.

8. The server of claim 7, wherein the predetermined situation is that a number of probes corresponding to a number of recognized vehicles is less than a predetermined threshold.

9. The server of claim 1, wherein the traffic information generator corrects a speed of the specialized vehicle type, when a number of probes corresponding to a number of recognized vehicles is less than a predetermined threshold, and generates the third traffic information based on the corrected speed.

10. The server of claim 9, wherein the traffic information generator corrects the speed of the specialized vehicle type depending on whether there are traffic lights on a road.

11. The server of claim 1, wherein the traffic information generator is further configured to generate the third traffic information by:
correcting the speed of the specialized vehicle type, wherein the speed of the specialized vehicle type is increased when the specialized vehicle type is the truck or the high occupancy vehicle, and wherein the speed of the specialized vehicle type is decreased when the specialized vehicle type is the ambulance or the fire truck; and
generating the third traffic information based on the corrected speed of the specialized vehicle type.

12. A method for providing vehicle information, the method comprising the steps of:
receiving, by a server, vehicle attribute information including a vehicle type and GPS trajectory information from a vehicle;
storing, in memory of the server, the vehicle attribute information and the GPS trajectory information for each vehicle type based on the vehicle attribute information;
generating, by the server, first traffic information associated with a specialized vehicle type needing the first traffic information, wherein the specialized vehicle type is at least one of a truck, a high occupancy vehicle, an ambulance, or a fire truck;
generating, by the server, second traffic information associated with a normal vehicle type, wherein the normal vehicle type is a vehicle other than the specialized vehicle type; and
providing, by the server, the specialized vehicle type with directions information based on the first traffic information, when a current situation is a special situation; and
providing, by the server, the normal vehicle type with directions information based on the second traffic information;
wherein the generating step includes generating third traffic information to be provided to the specialized vehicle type and the normal vehicle type in response to determining that a predetermined situation occurs where it is not necessary to divide the first and second traffic information.

13. The method of claim 12, wherein the generating step includes:
generating the first traffic information associated with the specialized vehicle type, based on a table for the specialized vehicle type and the special situation needing the first traffic information in response to the specialized vehicle type.

14. The method of claim 12,
wherein the special situation is a road congestion situation, when the specialized vehicle type is the high occupancy vehicle, and
wherein the generating of the traffic information includes generating the traffic information including a route where the vehicle travels on a bus-only road.

15. The method of claim 14, wherein the generating step includes generating traffic information in which a truck speed limit is reflected, when the specialized vehicle type is the truck.

16. The method of claim 12, wherein the providing step includes providing the specialized vehicle type and the normal vehicle type with the third traffic information.

17. The method of claim 16, wherein the predetermined situation is that a number of probes corresponding to a number of recognized vehicles is less than a predetermined threshold.

18. The method of claim 12, wherein generating the first traffic information includes;
correcting a speed of the specialized vehicle type, when a number of probes corresponding to a number of recognized vehicles is less than a predetermined threshold, and
generating the first traffic information based on the corrected speed.

19. The method of claim 18, wherein the generating step includes correcting the speed of the specialized vehicle type depending on whether there are traffic lights on a road.

20. The method of claim 12, wherein generating the third traffic information includes:
correcting the speed of the specialized vehicle type, wherein the speed of the specialized vehicle type is increased when the specialized vehicle type is the truck or the high occupancy vehicle, and wherein the speed of the specialized vehicle type is decreased when the specialized vehicle type is the ambulance or the fire truck; and
generating the third traffic information based on the corrected speed of the specialized vehicle type.

21. A non-transitory computer readable medium containing program instructions executed by a processor, the computer readable medium comprising:
program instructions that receive vehicle attribute information including a vehicle type and GPS trajectory information from a vehicle;
program instructions that store the vehicle attribute information and the GPS trajectory information for each vehicle type based on the vehicle attribute information;
program instructions that generate specialized traffic associated with a specialized vehicle type needing the first traffic information, wherein the specialized vehicle type is at least one of a truck, a high occupancy vehicle, an ambulance or a fire truck;
program instructions that generate second traffic information associated with a normal vehicle type, wherein the normal vehicle type is a vehicle other than the specialized vehicle type by;
program instructions that provide the specialized vehicle type with directions information based on the first traffic information, when a current situation is a special situation;
program instructions that provide the normal vehicle type with directions information based on the second traffic information; and program instructions that generate third traffic information to be provided to the specialized vehicle type and the normal vehicle type in response to determining that a predetermined situation occurs where it is not necessary to divide the first and second traffic information.

* * * * *